Figure 1:
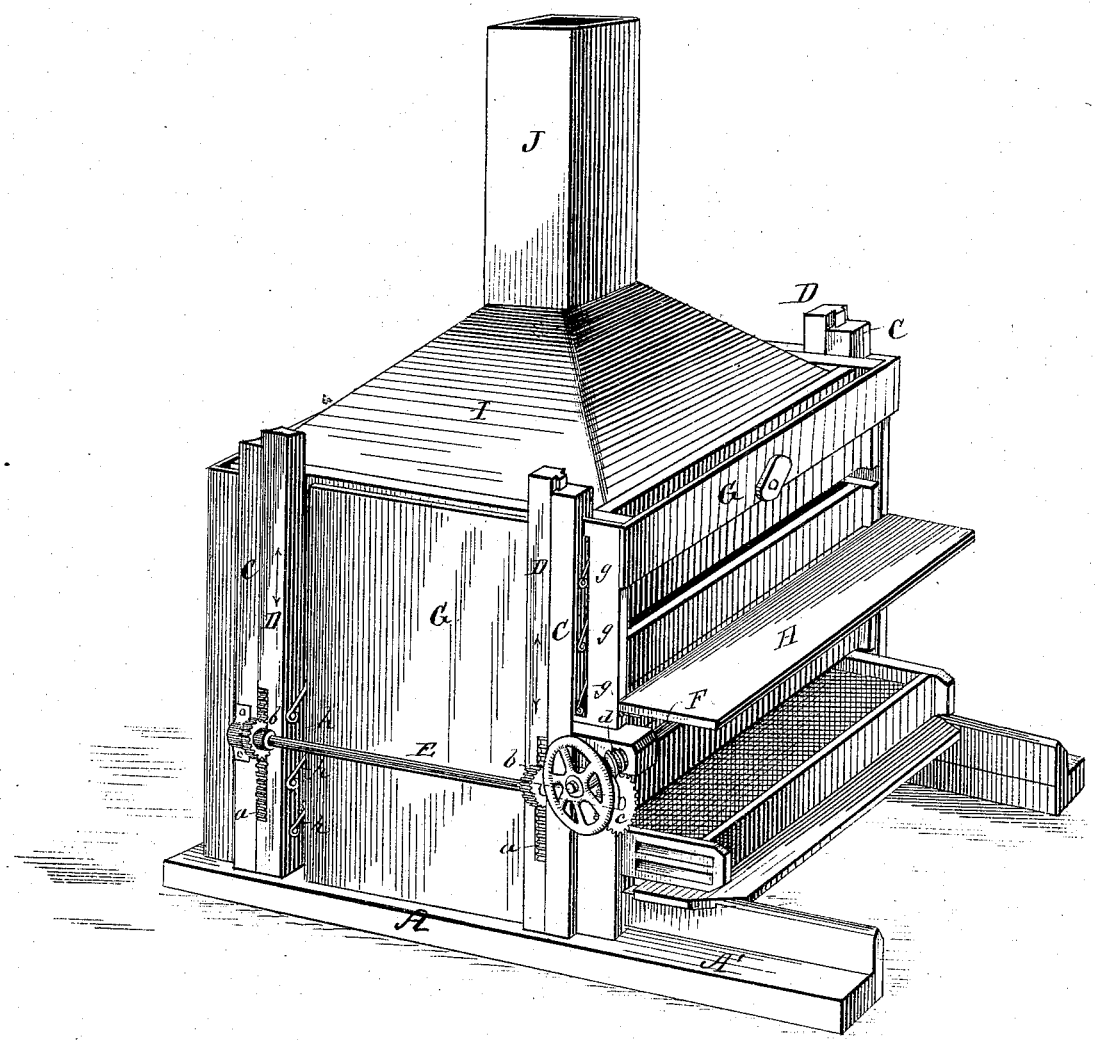
Figure 2:
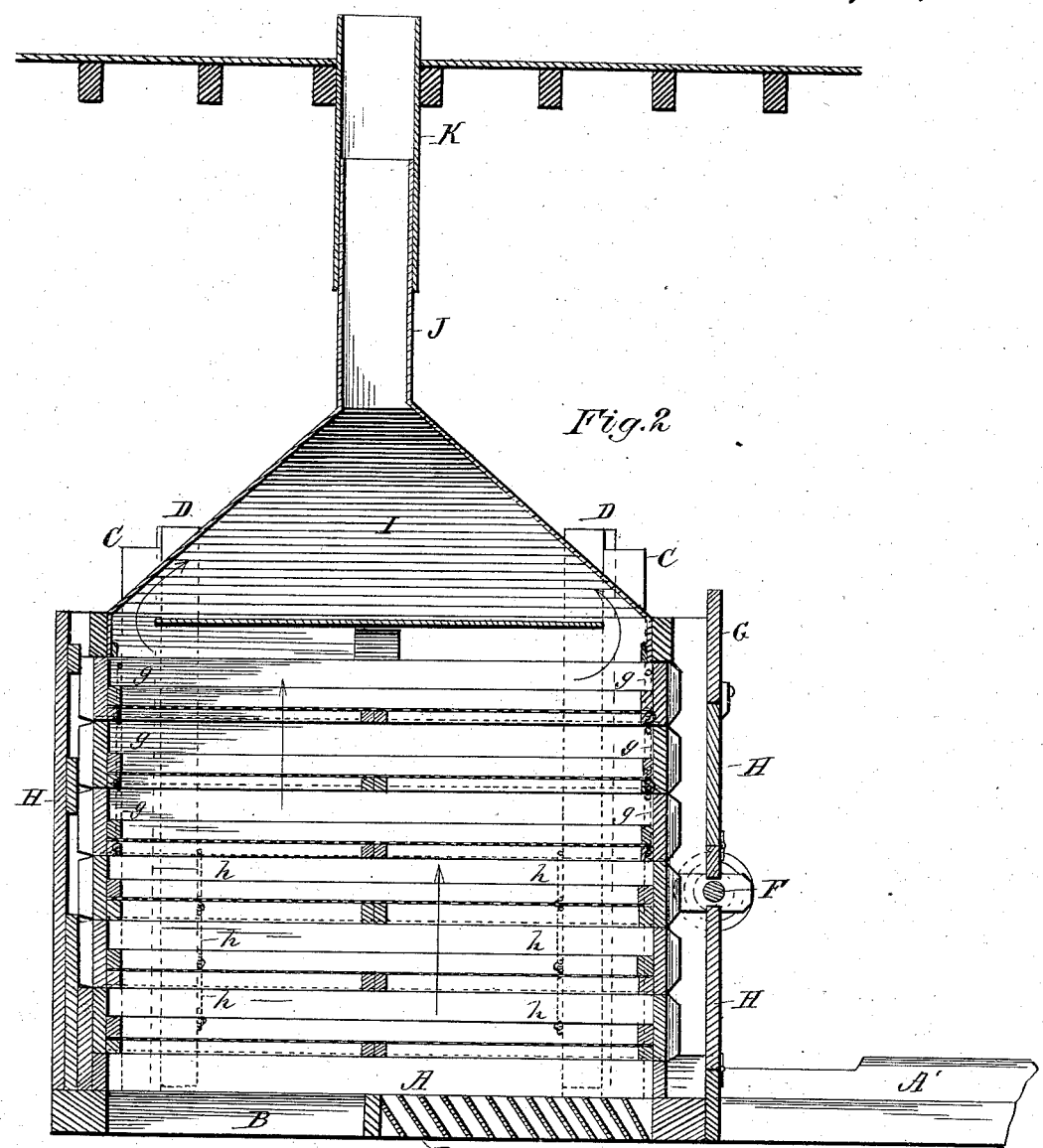
Figure 3:
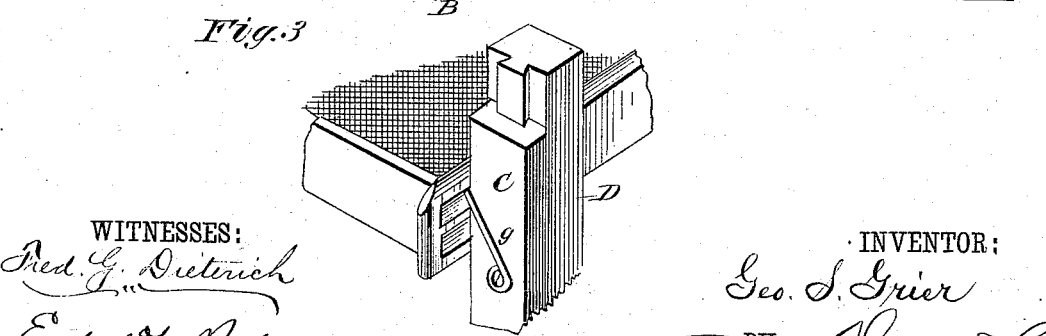

(No Model.)  2 Sheets—Sheet 1.

G. S. GRIER.
Fruit Drier.

No. 241,354.  Patented May 10, 1881.

WITNESSES:
Fred G. Dieterich
Edw. W. Byrn

INVENTOR:
Geo. S. Grier
BY
ATTORNEYS.

(No Model.) 2 Sheets—Sheet 2.

G. S. GRIER.
Fruit Drier.

No. 241,354. Patented May 10, 1881.

WITNESSES:
Fred. G. Dietrich
Edw. W. Byrn.

INVENTOR:
Geo. S. Grier
BY
ATTORNEYS.